United States Patent

[11] 3,610,252

| [72] | Inventors | Frans J. De Coene<br>Zedelgem;<br>Daniel C. C. Dewaele, Beselare, both of<br>Belgium |
|---|---|---|
| [21] | Appl. No. | 780,489 |
| [22] | Filed | Dec. 2, 1968 |
| [45] | Patented | Oct. 5, 1971 |
| [73] | Assignee | Clayson N. V.<br>Zedelgem, Belgium |
| [32] | Priority | Dec. 5, 1967 |
| [33] | | Belgium |
| [31] | | 47,468<br>Pat. 707 538 |

[54] APPARATUS FOR MEASURING QUANTITIES OF GRANULAR MATERIAL SUCH AS CORN GRAINS OR SIMILAR CROPS
2 Claims, 7 Drawing Figs.

[52] U.S. Cl. ................................................. 130/24, 56/DIG. 15
[51] Int. Cl. ........................................................ A01f 12/00
[50] Field of Search .......................................... 130/27, 24, 26

[56] References Cited
UNITED STATES PATENTS

| 2,887,226 | 5/1959 | Angus .......................... | 130/24 |
| 3,515,144 | 6/1970 | Morrison....................... | 130/26 |

FOREIGN PATENTS

| 1,157,337 | 7/1969 | Great Britain............... | 130/24 |
| 53,446 | 1/1967 | East Germany.......... | 130/24 |

*Primary Examiner*—Antonio F. Guida
*Attorneys*—Joseph A. Brown, John C. Thompson and James J. Kennedy ABSTRACT: This invention relates to an apparatus for measuring quantities of granular material, more especially corn, small grains or similar crops, consisting of letting the grains beat against a diaphragm or vibrating plate, whereby the mechanical impulses thus obtained are converted into electric impulses or vibrations, which are subsequently fed into a measuring or counting device.

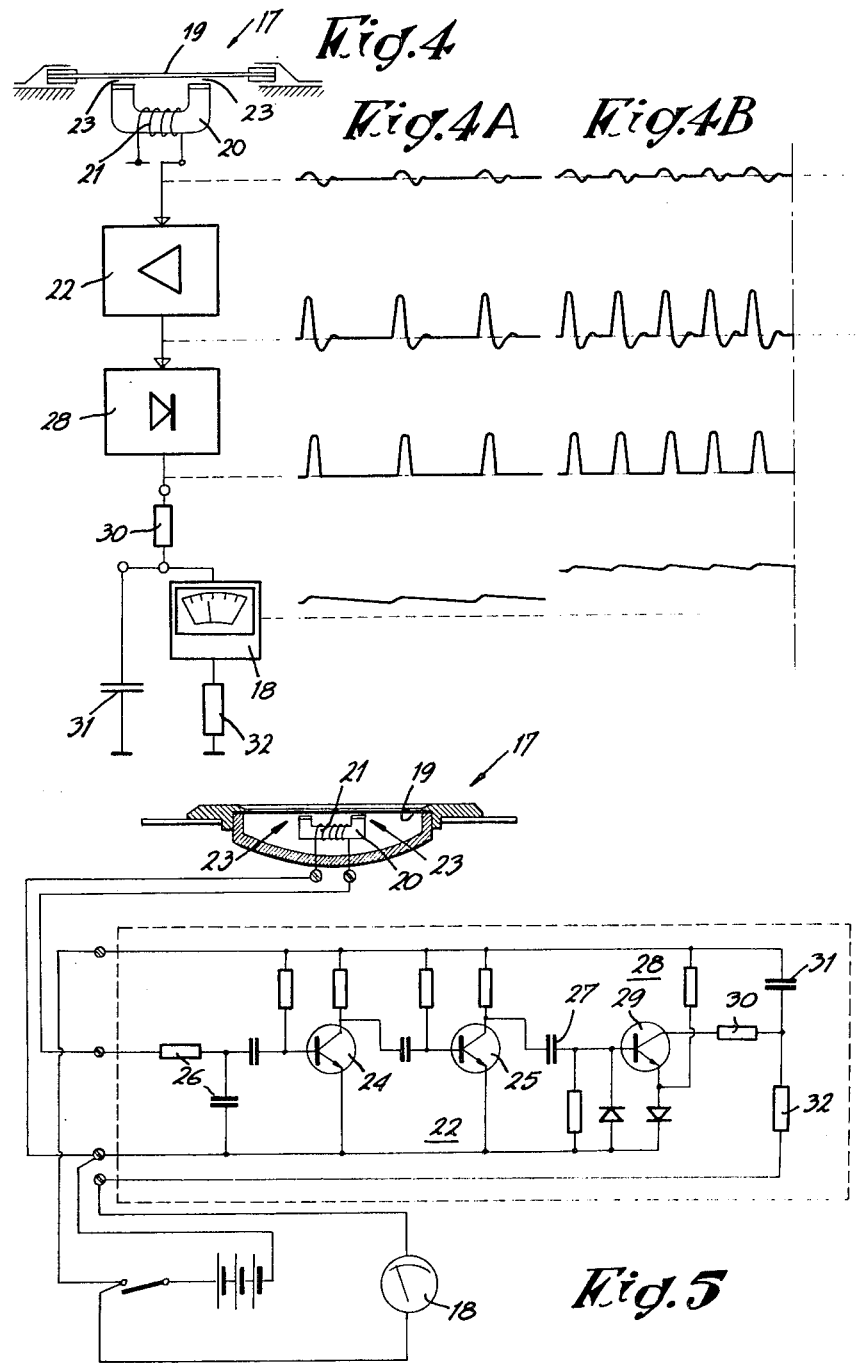

APPARATUS FOR MEASURING QUANTITIES OF GRANULAR MATERIAL SUCH AS CORN GRAINS OR SIMILAR CROPS

The invention is concerned with a device for the continuous measuring and indicating of quantities of granular matter, more particularly corn grains or similar crops, and is more specially intended for the application thereof to harvesting and picking machines, whereby the useful crop is separated from the plants, such as for instance in combined mowing-thrashing machines for the harvesting of wheat, soya beans, peanuts or other crops.

With such machines the mowing takes place while the machine drives over the harvest field, and the mown-off stalks are brought by means of a conveyor to the threshing box, where, after having passed through the threshing drum, they are separated into grains and straw on the straw shakers. The crops, for instance corn grains, fall through screens, while the chaff is blown away by a powerful air blast. The threshed-out straw leaves the machine at the rear.

During shaking as well as in the screen, certain losses occur, so that part of the useful grains is left behind in the straw, the foliage or other waste spread out on the field.

It is important to be able to measure these shaking and screening losses, so that in case of exaggerated losses, certain adjustments, such as the screen opening, the rotation speed of the threshing drum, the driving speed of the machine, etc., can be carried out. These adjustments depend among others upon the nature of the crop, the quality of the field, the humidity conditions, etc., and must consequently often be revised and modified.

Until now, the only method available for estimating these losses, consisted in counting the corn grains, which lay spread out behind the machine on the field. This method is cumbersome and requires the stopping of the machine, after which the driver has to go to the rear of the machine.

The purpose of the invention is to provide a device allowing the shaking and screen losses to be checked continuously from the driver's seat, while the machine is driven over the field in the course of normal operation.

The device according to the present invention is thus particularly concerned with the measuring and indicating of shaking and screen losses on combined harvesting and separating machines, and shall be explained more fully in the course of the following description with reference to this application.

The invention consists mainly therein, that the grain is forced to beat against a diaphragm or vibrating plate, and that the mechanical impacts thus obtained are converted into electric impulses or vibrations, which are subsequently fed into measuring or counting devices.

For the conversion of mechanical into electrical impulses, any sort of mechanical/electric or acoustic/electric transducer, such as for instance a microphone can be used. Measuring of the electric impulses can be carried out by means of an impulse counter, a frequency meter, a rectifier with smoothing device or any similar electric detection device, whereby the result of the measurement is indicated by some appropriate instrument.

When applying this device to harvesting machines such as for instance mower/threshers, the procedure according to the present invention is, that a sample is taken of the material falling from the shaker. This can be done for instance, by collecting part of this material in a funnel and leading it to a screen, which will eventually only let the grains and small waste pass: the chaff and other light wastes are removed by air blast; the thus separated and clean grains are than allowed to fall on aforesaid diaphragm or vibration plate.

The screen losses, i.e. the quantity of grains which falls beside or over the edge of the screen on the outside, can be evaluated in a similar manner.

The invention is also concerned with a device, which consists mainly of a mechanical/electric or acoustic/electric transducer or pickup, in which the mechanical impulses caused by the dropping upon them of the grains are converted into electric impulses or oscillations; a device for amplifying and if necessary transforming or regenerating the electrical signals thus received, as well as a detection device for the counting or for the measuring of the impulse frequency. This detection device can be connected to an appropriate indicating instrument which gives at any moment an indication which is proportional to the quantity, or respectively to the weight of falling grains per unit time, which quantity or respectively weight in its turn gives a measure of the shaking or respectively screening loss in the harvester.

The device can however also be equipped with an accumulating or respectively integrating type of apparatus, thus giving an indication which is a measure of the total quantity of grain, in number and/or weight, which has fallen upon the diaphragm as from a certain time.

The invention also extends to the application of such a device in combined harvesting and separating machines for checking the shaking end/or screening losses, as well as to any sort of harvester, which is equipped with such a device.

The invention will now be fully described and explained with reference to the appended drawings.

Figure 3:
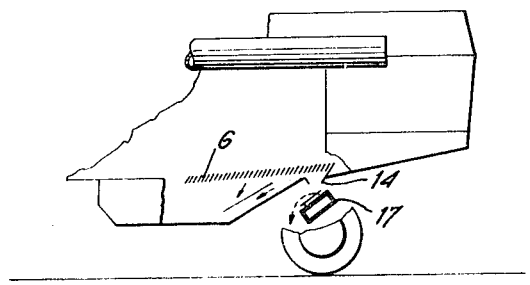

FIG. 3 gives a schematic view of the rear end of such a machine, in which the device according to the invention is applied for measuring the screening losses;

FIG. 4 gives as example a block-form diagram of an electric recording device according to the present invention;

FIGS. 4A and 4B show the electrical output at various portions of the measuring and indicating means, FIG. 4A representing the outputs when there are three grain impacts upon the diaphragm in a given time unit, and FIG. 4B representing the outputs when there are five grain impacts upon the diaphragm in a given time unit.

FIG. 5 gives, in way of information, a developed electrical diagram which can be applied in the device according to FIG. 4.

Figure 1:
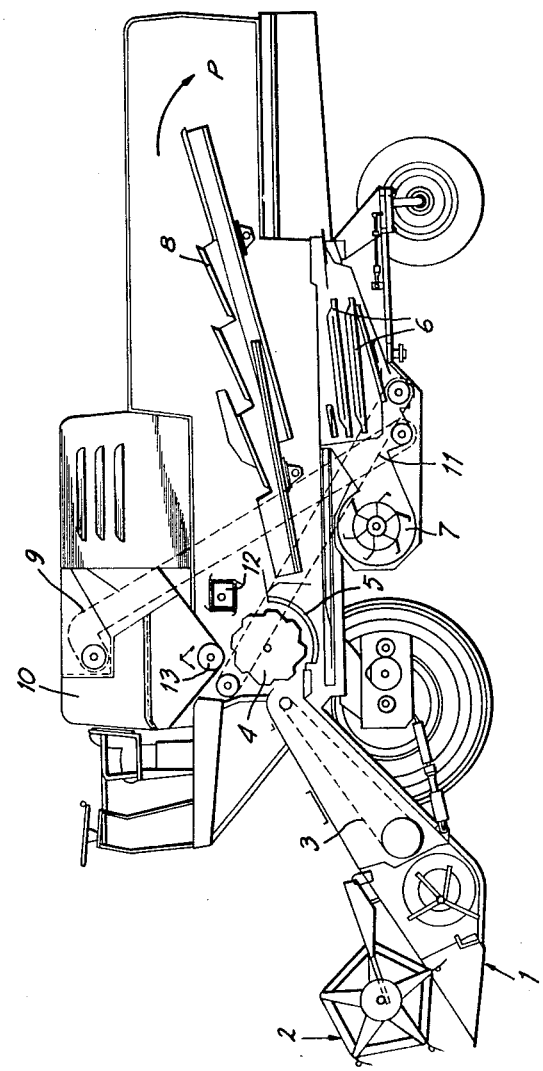
FIG. 1 shows a schematic representation of a combined mowing and threshing machine, upon which the device according to the present invention can be applied with great advantage.

The combined mowing/threshing machine shown in FIG. 1, mainly comprises a mowing board 1, above which is fitted a reel 2, a conveyor 3 and a threshing drum 4, which rotates in threshing cage 5. The stalks with the ears are fed by the conveyor to the threshing drum, which then detaches the corn grains; the corn grains thus obtained pass, partially together with the chaff, directly to the cleansing device, where the corn screens 6 together with an air blast created by fan 7 assure the separation and the cleansing of the corn grains. The remainder of the corn remains with the chaff in the straw and is thus brought to the shaking device 8, which serves the purpose of shaking the corn out of the straw. The corn detached by shaking also goes through screens 6 and falls, after having passed through an air blast, into a collecting vessel, from where a corn elevator 9 lifts it up to a corn tank 10 fitted on the top of the machine. The nonthreshed-out heavier growths, which pass over the screen, are collected and led back to the threshing drum by elevator 11, in order to detach the corn grains which they still contain. The foliage leaves the machine at the rear, as shown by arrow P. Behind the threshing drum 4, a straw mill 12 is provided for the combing of the straw, while the opening through which the corn tank can be emptied is shown at 13.

Figure 2:
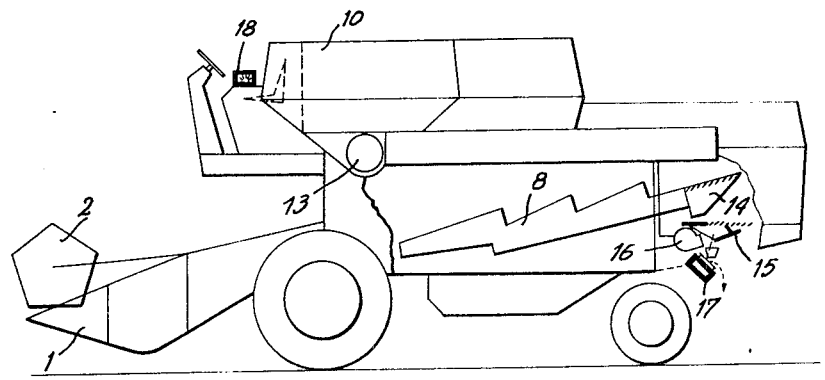
FIG. 2 is a schematic representation of such a combined machine, in which the device according to the invention is used for the measuring of losses at the rear side of the shaking device.

FIG. 2 shows in which way the device according to the present invention can be applied to such a combined mowing threshing machine, for continuously measuring and checking the corn losses at the rear side of the shakers. A representative part of the material which leaves shakers 8 at the rear is collected in a funnel 14, carried by at least one of said shaking devices, and led to screen 15, through which only corn grains and small refuse can pass. The chaff and other refuse is evacuated on the way by a powerful stream of air generated by a blowing apparatus 16, so that finally only corn grains remain, which then fall on a diaphragm or vibrating plate which is part of the recording device 17, or is else in close cooperation with same. In this recording device, which will be discussed more in detail with reference to FIGS. 4 and 5, an electric current is generated, which causes the deviation of the needle of an indicating device 18, and is a measure of the number, or respectively the weight, of the corn grains which strike the diaphragm per unit time.

The indicating device 18 is preferably located near the driver's seat at the front side of the machine, and in such a manner that the driver can easily keep an eye on its while performing his normal activities.

The measuring or recording device 17 can of course be fitted in any location where it is wished to check the losses, under the shaking devices. It is also possible to fit a recording device as described above in various locations, whereby one single indicating instrument is sufficient for reading the results, when this is for instance connected by means of a commutating switch successively to each of the recording apparatus.

FIG. 3 shows schematically how such a device can also be applied for obtaining indications of screen losses. If, for instance, the screen opening is adjusted too small, a certain proportion of the corn grains remains, which can not pass through the meshes of the screen and then finally passes over the edges, more particularly over the rear edge and falls out of the machine. As is shown in FIG. 3, a representative part of the grains is collected in a funnel 14 and consequently led towards the recording device 17.

An electrical measuring and recording device which is appropriate for the application of the invention must fundamentally comprise the following parts:

1. a converter for converting the mechanical or acoustical pulses, originating from the falling corn grains, into electrical vibrations or current pulses;

2. an amplifier or impulse former for amplifying the current pulses thus received, preferably in such a manner, that only the current pulses above a certain threshold give rise to output signals;

3. a detection device, which produces an electrical entity, preferably a current, which is a measure for the frequency and amplitude of the current pulses produced by the converter.

As converter it would be possible to use any sort of acoustical electric transducer, such as electrodynamic, electrostatic or carbon microphones. A normal microphone for sound recording is however generally constructed in such a way, that as far as possible a reproduction of high-fidelity with a wide sound spectrum is obtained, in other words, the microphone must, in as far as possible, have an equal sensitivity for all sound frequencies within as wide as possible a frequency band.

Such an instrument would thus not only react to the pulses of the falling grains, but would also transform into alternating current all sound waves which reach the vibrating plate, which would finally influence the measuring results by interfering signals.

This is why in the device according to the invention, this vibration plate is preferably made of relatively rigid and elastic material and fixed in such a way, that it would be relatively unsensitive to sound waves, but would on the other hand show a marked characteristic vibration frequency, which is preferably located below the frequency spectrum which is produced by the machine during operation. Each time a corn grain falls on the vibrating plate, a damped vibration is created according to the proper frequency of the plate, which vibration is converted by the pickup into an electrical vibration.

We thus obtain a signal mixture in which disturbing signals created by sound waves and other disturbance sources are distinguished from the current impulses which have to be measured by the fact that they have a smaller amplitude and a higher frequency. In order still further to attenuate these disturbing signals, frequency selecting means are provided in or around the amplifier, such as low-pass filters or a circuit which is tuned to the proper frequency of the vibrating plate and acts as band-pass filter.

In this manner the disturbing signals can be attenuated with respect to the useful signals to such an extend, that they can be totally eliminated by a threshold in one of the successive amplification or detection stages.

The above-mentioned useful signals, the frequency and amplitude of which are by approximation proportional respectively to the number of grains and to the weight of each grain, can then be led via a detecting device to an indicating instrument. The indications of the latter will thus give a measure of the weight of grains per unit time.

If only the number of grains is taken into consideration, it is advisable, in order to make the amplitude of the output signal as independent as possible of the shape and of the amplitude of the signal at the input of the amplifier, to overload one or several of the amplification stages, and more particularly the final stage, in such a manner that the peaks of the signals are cut off. By building the amplifier as a relaxation circuit or monostable multivibrator, it is possible to obtain that each input impulse which exceeds the threshold value is transformed into a rectangular output impulse of uniform amplitude and duration. In that case it is however desirable that the multivibrator should be designed in such a way that the restoration time after each regenerated impulse be as short as possible, so that the discriminating power of the device, i.e. the capacity of separately detecting input impulses arising in rapid succession, does not become too small.

As detector, a simple rectifier with smoothing device, an impulse extender, an impulse counting device, or any similar circuit can be used, which feeds an indicating instrument such as for instance a microammeter.

As example of an embodiment, a simplified fundamental circuit is shown in FIG. 4 and in further developed form in FIG. 5.

As is shown in these figures, this circuit comprises in the present case an electrodynamic pickup 17, consisting mainly of a vibrating platelet 19, an iron core with permanent magnetism 20 and a pickup coil 21 applied to the latter, which is finally connected to the input of an amplifier 22. The vibrating platelet is attached in such a manner to a fixed part of the device, that it has a marked natural frequency, but remains unsensitive to higher frequencies.

Falling corn grains create a movement in the vibrating platelet 19, which carries out a damped vibration at natural frequency as the result of each impact. Consequently, the air gap 23 between the iron core 20 and the vibrating platelet changes. Due to the modification of permeability in the magnetic circuit, a variation of flux is created, whereby an electromotive force is induced in winding 21.

An image of the input signal thus obtained, which is fed to amplifier 22, is reproduced separately at the height of the connection to the amplifier in FIG. 4, by FIGS. 4A and 4B, whereby each successive vibration phenomenon represents one falling corn grain, the number of vibrations per unit time is thus a measure per unit of time of the number of corn grains fallen, and thus also of the magnitude of the loss. This is shown in FIGS. 4A and B respectively for a medium and relatively large value.

In the present example, amplifier 22 is built as a two-stage transistor amplifier with transistors 24 and 25. Despite the selective properties of the vibrating platelet, the input signal still contains disturbance signals brought about by sound and other disturbing vibrations. These disturbing signals have a smaller amplitude and mainly higher frequencies. In order further to attenuate these disturbance signals, a low-pass filter in the form of an RC-circuit 26 is incorporated in the input circuit.

The amplified signal, which is also reproduced in FIGS. 4A and B at a level with the connection to the output of the amplifier, is transmitted via a coupling condenser 27 to detector 28.

The latter mainly comprises a transistor 29, which receives the amplified signal at its base and which is hooked up in such a manner that it only becomes conducting when the signal exceeds a certain threshold value.

The pulsating collector current of transistor 29 is thus again shown in FIGS. 4A and B at the level of the output terminals of detector 28; it shows a separate current peak for each vibration created in the vibration platelet. By means of these current peaks, a condenser 31 is periodically charged via resistance 30, and is on the other hand discharged by a sufficiently large resistance 32 and an indicating instrument which in this case is a microammeter 18. The indication of this instrument is proportional to the average load of condenser 31 and this again is approximately proportional to the number of current peaks which are supplied per unit of time by detector 28 as well as to the amplitude of aforesaid current peaks. In consequency the indication is a measure of the amplitude, in weight, of the corn loss per unit of time.

The above described embodiment is of course liable to modifications of the values of resistances and condensers, of the number and type of transistors used, and even of the fundamental working principle of the various parts. As already described above, the pickup may be based on another than the electrodynamic principle.

The present invention is in the first place concerned with the device to be used for measuring quantities of granular matter, but extends also to all agricultural and similar machines, which are equipped with such a device.

What we claim is:

1. In combination with a combine adapted to be propelled forwardly over a field of crop material and having a threshing drum rotatively mounted at its forward end and adapted upon rotation to detach grain from other crop material, a threshing cage which cooperates with the threshing drum and through which most of detached grain passes, shaking devices mounted to the rear of said threshing drum and threshing cage which receive the other crop material and grain which does not pass through the threshing cage and which shakes most of the unpassed grain from the other crop material, first grain-separating and -cleaning screen means disposed below said threshing cage and said shaking devices, and first fan means operable to direct a blast of air through said separating and cleaning screen means; the combination therewith of a grain loss detection device for measuring and indicating the loss of grain which passes over the rear end of the shaking devices, said detection device comprising a funnel means carried by at least one of said shaking devices and operable to divert from discharge a representative portion of the other crop material and grain which did not pass through the threshing cage and shaking devices, second grain-separating and -cleaning screen means mounted below said funnel means and operable to receive said representative portion and through which only grains and small refuse can pass, second fan means mounted below and forwardly of said second screen means and operable to direct a stream of air up through said second screen means for evacuating the chaff and other refuse which does not pass through the second screen means from said combine, measuring and indicating means including a sensing device mounted below said second screen means and operable to create impulses on engagement by said grain, and an indicator disposed so as to be readily visible to the operator of the combine and responsive to the sensing device to indicate the grain loss.

2. The combination set forth in claim 1 in which said sensing device is made of relative rigid and elastic material and fixed in such a way that it is relatively insensitive to sound waves but shows a marked characteristic vibration frequency which is located below the frequency spectrum which is produced by the machine during operation.